US012583574B2

(12) United States Patent　(10) Patent No.:　US 12,583,574 B2
Llamas Sandin　(45) Date of Patent:　Mar. 24, 2026

(54) AIRCRAFT LIFTING SURFACE AND AIRCRAFT COMPRISING SUCH LIFTING SURFACE

(71) Applicant: Airbus Operations S.L.U., Getafe (ES)

(72) Inventor: Raul Carlos Llamas Sandin, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 0 days.

(21) Appl. No.: 18/670,218

(22) Filed: May 21, 2024

(65) Prior Publication Data

US 2024/0391582 A1　Nov. 28, 2024

(30) Foreign Application Priority Data

May 23, 2023　(EP) ..................................... 23382480

(51) Int. Cl.
B64C 23/00　(2006.01)
B64C 9/18　(2006.01)

(52) U.S. Cl.
CPC .............. *B64C 9/18* (2013.01); *B64C 23/005* (2013.01); *B64C 2230/12* (2013.01)

(58) Field of Classification Search
CPC ........................... B64C 23/005; B64C 2230/12
See application file for complete search history.

(56) References Cited

U.S. PATENT DOCUMENTS

| | | | |
|---|---|---|---|
| 11,192,639 B2 | 12/2021 | Llamas Sandin | |
| 2012/0312923 A1* | 12/2012 | Chang ................... | B64C 23/005 244/130 |
| 2019/0193843 A1 | 6/2019 | Kikuchi et al. | |
| 2019/0300159 A1 | 10/2019 | Kikuchi et al. | |
| 2019/0322358 A1 | 10/2019 | Kato et al. | |
| 2019/0329870 A1 | 10/2019 | Kato et al. | |
| 2019/0344878 A1 | 11/2019 | Kato et al. | |

FOREIGN PATENT DOCUMENTS

EP　　3738882 A1　11/2020

OTHER PUBLICATIONS

European Search Report for corresponding European Patent Application No. 23382480 dated Oct. 25, 2023.

* cited by examiner

*Primary Examiner* — Timothy D Collins
*Assistant Examiner* — Terri L Filosi
(74) *Attorney, Agent, or Firm* — Greer, Burns & Crain, Ltd.

(57) ABSTRACT

An aircraft lifting surface comprising an aerodynamic surface with a first electrode embedded at its surface, and a control surface articulated to the aerodynamic surface, the control surface comprises a second electrode embedded at its surface, and that the first electrode and the second electrode are arranged and adapted to create a plasma in air upon application of a predetermined electrical tension, called ionizing tension, between the first electrode and the second electrode.

15 Claims, 2 Drawing Sheets

AIRCRAFT LIFTING SURFACE AND AIRCRAFT COMPRISING SUCH LIFTING SURFACE

CROSS-REFERENCES TO RELATED APPLICATIONS

This application claims the benefit of European Patent Application Number 23 382 480.4 filed on May 23, 2023, the entire disclosure of which is incorporated herein by way of reference.

FIELD OF THE INVENTION

The invention relates to an aircraft lifting surface with high performance aerodynamics and to an aircraft comprising such lifting surface. More particularly, the invention relates to an aircraft lifting surface with active control of its boundary layer separation.

BACKGROUND OF THE INVENTION

The separation of a boundary layer on a lift surface or a control surface, which usually happens at high angles of attack, is detrimental to the aerodynamic behavior, to the efficiency of the aircraft, as well as to the control of the aircraft. Delaying the separation of the boundary layer allows to improve the maneuverability of the aircraft and its efficiency at high angles of attack.

EP 3738882 discloses an aerodynamic surface comprising a pair of electrodes adapted to generate a plasma in the boundary layer of air along the aerodynamic surface upon application of an electrical voltage signal between the electrodes. This document describes that the electrodes may be placed on a fore portion of an extrados of lift or control surfaces of an aircraft, in particular for ensuring functions such as delaying stall at high angle of attack and improving laminarity of a flow over an aerodynamic surface of the lift or control surface.

However, such embodiments do not solve the problem of boundary layer separation at the transition between two lift and control surfaces of an aircraft, such as the transition between an aerodynamic surface such as a fixed portion of a wing and a control surface such as a flap or aileron, or between an horizontal stabilizer and an elevator.

SUMMARY OF THE INVENTION

The invention aims to solve this problem and to provide an aircraft lifting surface with high performance, including with articulated lift and control surfaces.

The invention proposes
an aircraft lifting surface comprising:
  an aerodynamic surface:
    comprising at least a first electrode embedded at its surface,
  a control surface:
    articulated to the aerodynamic surface,
  wherein the control surface comprises at least a second electrode embedded at its surface,
  and the first electrode and the second electrode are arranged and adapted to create a plasma in air upon application of a predetermined electrical tension, called ionizing tension, between the first electrode and the second electrode.
An aerodynamic surface of an aircraft may be any surface of the aircraft that is adapted to provide lift to the aircraft.

It may in particular comprise lift surfaces such as wings, horizontal and flow control surfaces such as vertical tail planes. Control surfaces may in particular comprise slats, flaps, ailerons, elevators, rudders, spoilers, tabs.

The control surface is articulated to the aerodynamic surface so as to form an angle with the aerodynamic surface. Such an angle may be defined between a medium plane of the control surface and a medium plane of the aerodynamic surface. In a nominal position of the control surface with respect to the aerodynamic surface, this angle may have a reference value, such as for example a reference value of or close to zero.

The first electrode and the second electrode are arranged and adapted to create a plasma in air upon application of the ionizing tension between the first electrode and the second electrode. In particular the distance between the first electrode and the second electrode is adapted to obtain a plasma in air upon application of the ionizing tension.

According to the invention, the first electrode and the second electrode are arranged and adapted to create a plasma in air upon application of a predetermined electrical tension, called ionizing tension, between the first electrode and the second electrode, in at least one relative position of the aerodynamic surface and the control surface.

A minimal ionizing tension may be chosen so as to obtain said plasma in air between the first electrode and the second electrode. In particular, specific values of voltage and frequency may be defined for the ionizing tension to be adapted to obtain a plasma in air between the first electrode and the second electrode. Other ionizing tensions above this minimal value may be chosen to obtain different characteristics of plasma in air.

The application of a high voltage between the first electrode and the second electrode creates a plasma that induces an ionic wind in the air right above and between the electrodes. This ionic wind locally imparts a momentum to the airflow such that the air particles may overcome the increasing static pressure as it moves towards the leading edge. This locally imparted momentum allows to delay the separation of the flow of air along the lifting surface, such that the lift generation capabilities of this lifting surface are improved.

The first electrode may be arranged on the extrados of the trailing edge of the aerodynamic surface. The second electrode may be arranged on the extrados of the leading edge of the control surface. Arranging the electrodes on the extrados allows them to act on air flows along the extrados of the aerodynamic surface and control surface.

Alternatively, the first electrode may be arranged on the intrados of the trailing edge of the aerodynamic surface and the second electrode may be arranged on the intrados of the leading edge of the control surface. Arranging the electrodes on the extrados allows them to act on air flows along the intrados of the control surface.

A lifting surface of the invention provides very good airflow along the aerodynamic surface and the control surface. The invention allows to delay the separation of the boundary layer from the aerodynamic surface and the control surface, in particular when increasing their angle of attack.

More particularly, the invention improves the air flow at the surface discontinuity between the aerodynamic surface trailing edge and the control surface leading edge. The invention allows to maintain an attached flow between the aerodynamic surface and the control surface even when the control surface is deflected with respect to the aerodynamic surface. In particular, the invention allows to maintain an attached flow along the aerodynamic surface and the control surface even when the control surface is deflected with high angles of deflection with respect to the aerodynamic surface.

At least one of the first electrode and the second electrode is embedded beneath a dielectric layer.

The electrodes are embedded in the surface of the aerodynamic surface and the control surface, that is the electrodes are either:

exposed to air on the aerodynamic surface or the control surface, or embedded beneath a thin layer of another material, such as for example a paint, an electrical insulating material, etc.

In some embodiments, the first electrode may be arranged so as to be exposed to air while the second electrode is embedded beneath a dielectric layer.

In other embodiments, the second electrode may be arranged so as to be exposed to air while the first electrode is embedded beneath a dielectric layer.

In any case the electrodes are embedded respectively in the aerodynamic surface and the control surface, such that, when no voltage is applied between the electrodes, the electrodes do not influence the airflow over the aerodynamic surface and the control surface.

The first electrode is arranged in a trailing portion of the aerodynamic surface.

A trailing portion of the aerodynamic surface may be defined as the rear half of the aerodynamic surface along the chord, in particular it may be understood to be the rear 20% of the aerodynamic surface.

The first electrode may be arranged along an open edge of the trailing edge of the aerodynamic surface.

The first electrode may be arranged along an open edge of the trailing edge of the extrados of the aerodynamic surface. In such embodiments, the first electrode is thus arranged at the extreme rear end of the aerodynamic surface.

The second electrode is arranged in a leading portion of the control surface.

A leading portion of the control surface may be defined as the front half of the control surface along the chord, in particular it may be understood to be the front 20% of the control surface from its leading edge towards its trailing edge, along its chord.

In a nominal position of the control surface, the leading edge of the control surface is adapted to be housed in a trailing edge of the aerodynamic surface.

The control surface being in the nominal position, the second electrode is arranged on the leading edge of the control surface so as to be housed within the trailing edge of the aerodynamic surface.

The second electrode may even be, with the control surface in the nominal position, longitudinally along the longitudinal direction of an aircraft corresponding to the chord of the aerodynamic surface, forward of the first electrode. When the control surface is in a position different from the nominal position, forming with the aerodynamic surface an angle superior or equal to the deflection angle, the second electrode is longitudinally aft of the first electrode.

In some embodiments of an aircraft lifting surface according to the invention:

the aerodynamic surface comprises:

the first electrode on its extrados, a third electrode on its intrados, the control surface comprises:

the second electrode on its extrados, a fourth electrode on its intrados, the third electrode and the fourth electrode are adapted to create a plasma in air upon application of the ionizing tension between the third electrode and the fourth electrode.

The third electrode and the fourth electrode are adapted to create a plasma in air upon application of the ionizing tension, between the third electrode and the fourth electrode, in at least some relative positions of the control surface and the aerodynamic surface.

In some embodiments of an aircraft lifting surface according to the invention:

the third electrode is arranged in a trailing portion of the aerodynamic surface, the fourth electrode is arranged on the leading edge of the control surface so as to be housed within the trailing edge of the aerodynamic surface with the control surface in the nominal position.

The third electrode may be arranged along an open edge of the trailing edge of the aerodynamic surface. The third electrode may be arranged along an open edge of the trailing edge of the intrados of the aerodynamic surface.

The control surface may comprise an array of second electrodes, said second electrodes being separated from each other along the chord of the control surface.

In such embodiments, the control surface comprises multiple electrodes, called together as "a group of second electrodes" in reference to the second electrode of embodiments in which the control surface comprises only one second electrode. Said group of second electrodes is arranged on the extrados of the leading edge of the control surface.

The second electrodes are separated from each other along the chord so as to form multiple lines at the surface of the control surface. The second electrodes extend in the span direction of the control surface; however they may be angled with respect to the span direction.

With the control surface in nominal position, all or all but one second electrode is housed in the trailing edge of the aerodynamic surface.

When the control surface is actuated so as to be angled with respect to its nominal position, each second electrode of the group of second electrodes may be activated in cooperation with the first electrode sequentially as they appear behind the trailing edge of the aerodynamic surface. Thereby, the distance between the first electrode and the activated second electrode may always remain within a predetermined distance range.

The invention also encompass an aircraft comprising a lifting surface of the invention.

The aircraft further comprises an electrical power source connected to the first electrode and to the second electrode so as to apply the ionizing tension between the first electrode and the second electrode.

The aircraft is characterized in that it further comprises a control device adapted to energize the first electrode and second electrode upon predetermined conditions.

In particular, the control device may receive, as an input, an inclination of the aircraft and/or a relative position of the control surface with respect to the aerodynamic surface. More particularly, the control device may apply an ionizing tension to one or another couple of electrodes based on an angle between the control surface and the aerodynamic surface.

The aircraft is characterized in that the control surface has a nominal position with respect to the aerodynamic surface, and the control device is adapted to energize the first electrode and second electrode when the control surface is deflected from its nominal position of at least a predetermined angle, called deflection angle.

The aircraft is characterized in that the control device is adapted to energize the third electrode and the fourth electrode when the control surface is deflected from its nominal position below a predetermined angle.

This predetermined angle for activation of the third electrode and the fourth electrode may be of opposite value from the deflection angle; for example if the deflection angle is 5 degrees, then this predetermined angle may be of −5 degrees.

As a consequence, either the first electrode and the second electrode are activated upon deflection in a first direction or the third electrode and the fourth electrode are activated upon deflection in a second direction opposite to the first direction.

The invention also extends to other possible combinations of features described in the above description and in the following description relative to the figures. In particular, the invention extends to aircrafts comprising features described in relation to the aircraft lifting surface.

BRIEF DESCRIPTION OF THE DRAWINGS

Some specific exemplary embodiments and aspects of the invention are described in the following description in reference to the accompanying figures.

DETAILED DESCRIPTION OF THE PREFERRED EMBODIMENTS

Figure 1:
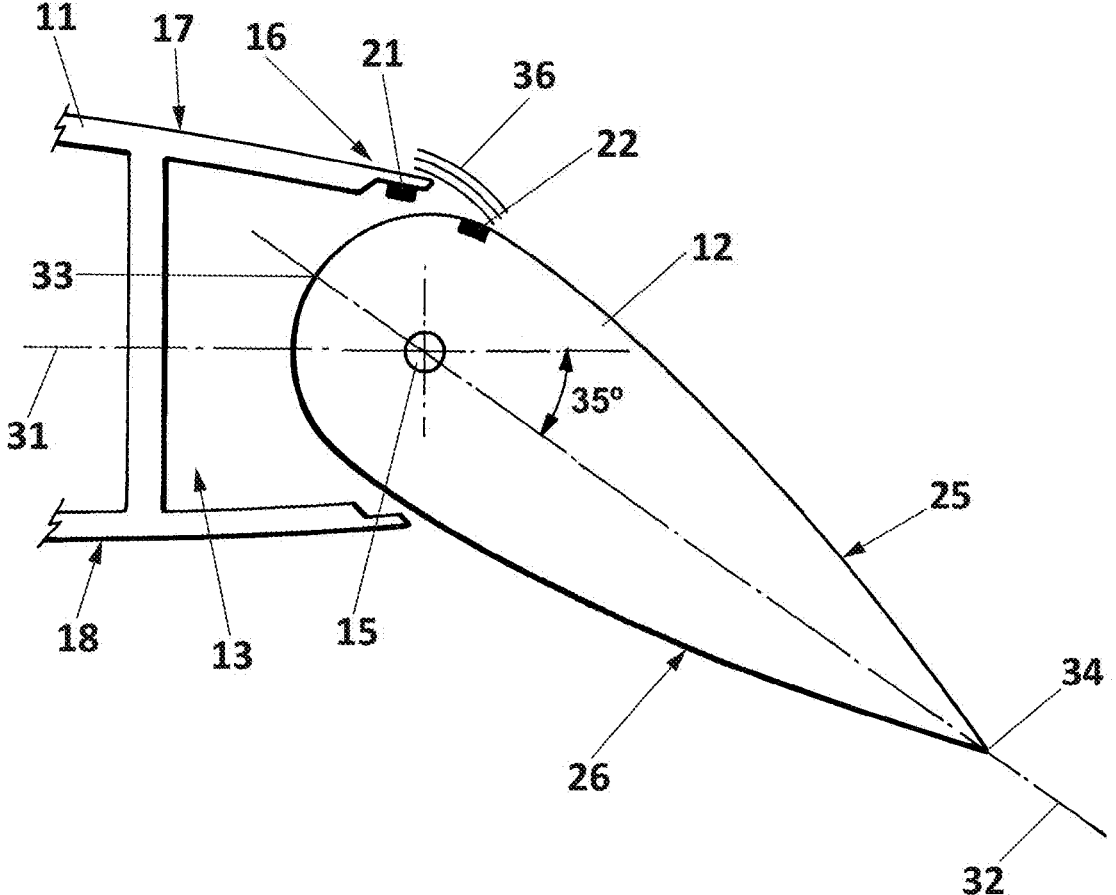
FIG. 1 is a schematic representation of a cross-section of a first embodiment of an aircraft lifting surface according to the invention.

In FIG. 1 a cross section of part of an aircraft according to the invention is shown. In this figure an aft portion of a lifting surface 10 is represented. This lifting surface 10 may for example be a horizontal tail plane.

The lifting surface 10 comprises an aerodynamic surface 11. The aerodynamic surface 11 may for example be the fixed portion of the horizontal tail plane.

The figure also comprises the representation of a control surface 12. This control surface 12 may be an elevator of the horizontal tail plane. The control surface 12 is articulated to the aerodynamic surface 11 in rotation along a rotation axis 15. In this figure, the control surface 12 is represented in a non-nominal position with respect to the aerodynamic surface 11. The angle formed between a medium plane 32 of the control surface 12 and a medium plane 31 of the aerodynamic surface 11 may be defined to have a value of zero when the control surface 12 is in a nominal position with respect to the aerodynamic surface 11.

The medium plane 32 of the control surface 12 may be defined as a plane comprising a leading edge 33 of the control surface 12 and a trailing edge 34 of the control surface 12. The medium plane 32 separates the surface of the control surface 12 between an extrados 25 and an intrados 26. Similarly, a medium plane 31 of the aerodynamic surface 11 may be defined between an extrados 17 and an intrados 18 of the aerodynamic surface 11. The intersections between the medium planes 31, 32 and this cross-section of FIG. 1 represents the chords respectively of the aerodynamic surface 11 and the control surface 12.

In this figure, the angle 35 between the medium plane 31 of the aerodynamic surface 11 and the medium plane 32 of the control surface 12 is different from zero, for example—between 20 and 35 degrees.

The aerodynamic surface 11 comprises a first electrode 21 embedded at its surface. The first electrode 21 is embedded at a rear edge 16 of the aerodynamic surface 11, which may be considered as the trailing edge of the aerodynamic surface 11.

The control surface 12 comprises a second electrode 22 embedded at its surface. The second electrode 22 is embedded in a front portion of the control surface 12, which may be considered as a leading edge portion of the control surface 12. In particular in this embodiment the second electrode 22 is placed in the front 25% of the control surface 12 along its chord. In this embodiment, the second electrode 22 may be embedded below a dielectric layer (not represented for clarity of the figure).

Figure 2:
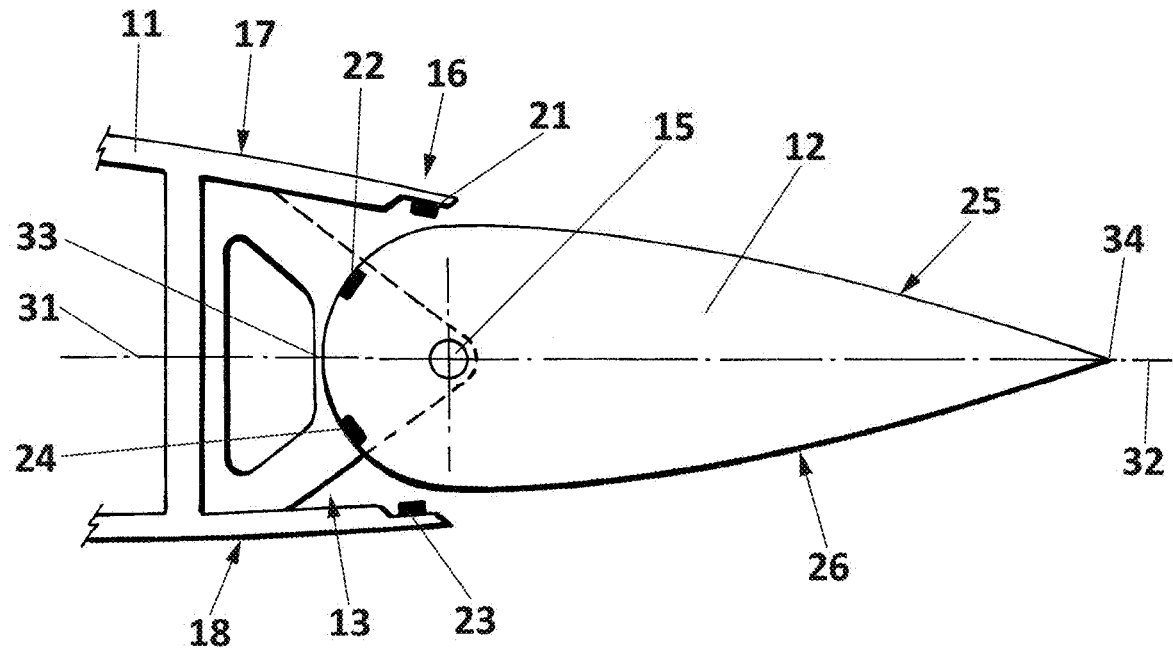
FIG. 2 is a schematic representation of a cross-section of a second embodiment of an aircraft lifting surface according to the invention.

As shown in FIG. 2, the rear portion (or trailing edge) of the aerodynamic surface 11 comprises a housing 13 between the trailing edge of its extrados 17 and the trailing edge of its intrados 18. When the control surface 12 is in a nominal position with respect to the aerodynamic surface 11, the leading edge 33 of the control surface 12 is housed within said housing 13.

As show in FIG. 2, particularly, in this embodiment, when the control surface 12 is in a nominal position with respect to the aerodynamic surface 11, the second electrode 22 is housed within said housing 13.

More particularly, in this embodiment, when the control surface 12 is in a nominal position with respect to the aerodynamic surface 11, the second electrode 22 is housed within said housing 13.

As the control surface 12 is rotated with respect to the aerodynamic surface 11, there is an angle, said deflection angle, at which the second electrode 22 emerges from said housing 13 so that it may be exposed to an airflow along the aerodynamic surface 11 and control surface 12. The deflection angle may be of about 15 degrees. When this deflection angle is reached, a voltage may be applied between the first electrode 21 and the second electrode 22 such that a plasma may be formed in the airflow. The formation of the plasma creates an ionic wind 36 represented with lines between the two electrodes 21, 22 on FIG. 1. This ionic wind has proved to delay the separation of the boundary layer along the control surface 12.

The application, between the first electrode 21 and the second electrode 22, of a predefined voltage above a minimum tension value, called ionizing tension, may be triggered automatically depending on the angle between the control surface 12 and the aerodynamic surface 11.

FIG. 2 shows a second embodiment according to the invention. The aerodynamic surface 11 and the control surface 12 are similar to those of FIG. 1.

In this figure, the control surface 12 is represented in a nominal position with respect to the aerodynamic surface 11. The angle between the medium plane 31 of the aerodynamic surface 11 and the medium plane 32 of the control surface 12 is null. As a result, the leading edge portion of the control surface 12 is housed within the housing 13 of the aft portion of the aerodynamic surface 11.

In this embodiment, the aerodynamic surface 11 also comprises a first electrode 21 at a rear edge 16 of its extrados 17 and the control surface 12 comprises a second electrode 22 in a front portion of its extrados 25.

Contrary to the embodiment of FIG. 1, in this embodiment of FIG. 2, the aerodynamic surface 11 also comprises a third electrode 23 at a rear edge of its intrados 18. Also, the control surface 12 comprises a fourth electrode 24 in a front portion of its intrados 26. Thereby, when the control surface 12 is rotated clockwise around the rotation axis 15 in this representation of FIG. 2, the second electrode emerges from the housing 13 when the angle 35 is above a first deflection angle. Similarly, when the control surface 12 is rotated anti-clockwise from its nominal position, below a second deflection angle, the third electrode emerges from the housing 13. With the angle 35 taking the value zero in the nominal position, the first deflection angle and the second deflection angle have opposite signs.

Thereby in such embodiment, a plasma may be formed on the extrados when the control surface is deflected so as to increase the path of air on the extrados of the lifting surface 10, and a plasma may be formed on the intrados when the control surface in deflected so as to increase the path of air on the intrados of the lifting surface 10.

Figure 3:
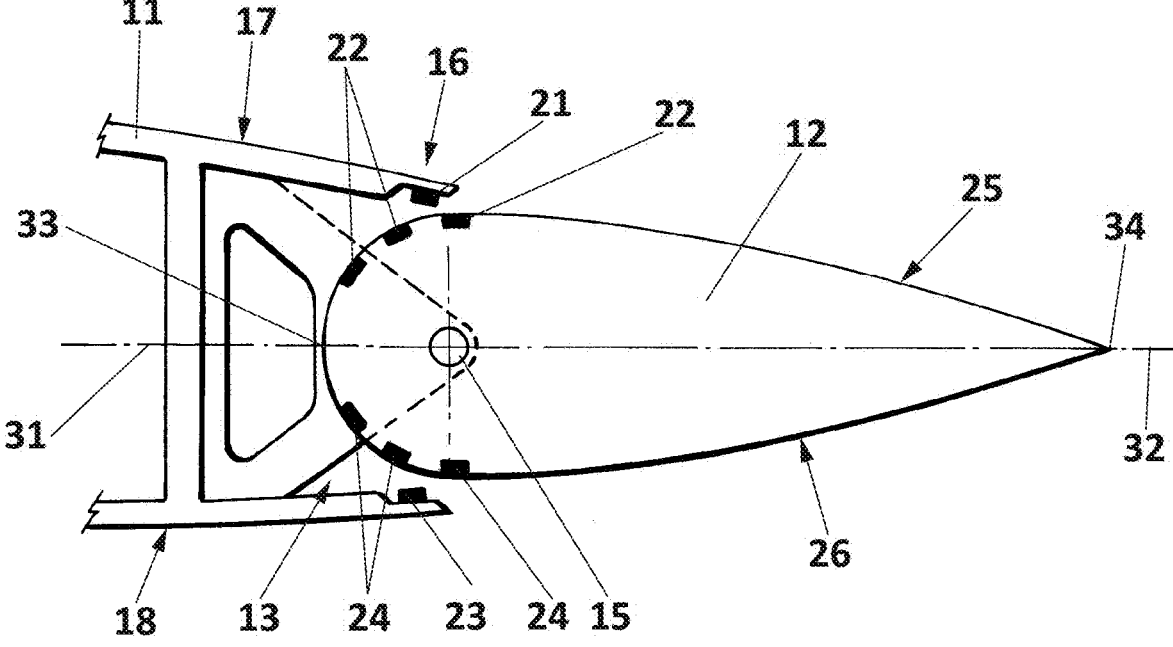
FIG. 3 is a schematic representation of a cross-section of a third embodiment of an aircraft lifting surface according to the invention.

FIG. 3 shows a third embodiment according to the invention. The aerodynamic surface 11 and the control surface 12 are similar to those of FIG. 1. As in FIG. 2, the aerodynamic surface 11 comprises a first electrode 21 on its extrados and a third electrode 23 on its intrados.

Contrary to the embodiment of FIG. 2, the control surface 12 comprises an extrados group of electrodes comprising a plurality of second electrodes 22 in a front portion of its extrados 25. The control surface 12 also comprises an intrados group of electrodes comprising a plurality of fourth electrodes 24 in a front portion of its intrados 26.

The second electrodes 22 are separated from each other along the chord of the control surface 12. Thereby a rotation of the control surface 12 around its rotation axis 15 in a clockwise direction will make the second electrodes 22 emerge one after the other from the housing 13. The chord distance between two successive second electrodes 22 may be adapted such that when the distance between the first electrode 21 and the closest exposed second electrodes becomes two large for a plasma to be effectively created in the airflow, a new second electrode emerges from the housing 13 so as to be exposed to air.

The ionizing tension may be applied successively between the first electrode 21 and each of the second electrodes 22 successively emerging from the housing 13. Thereby, the higher the number of second electrodes in the extrados group of electrodes, the wider the range of angles at which a plasma may be created between the first electrode 21 and one of the second electrodes 22.

A controller may determine which of the second electrodes 22 to apply a voltage to based on the rotation angle 35 between the control surface 12 and the aerodynamic surface 11.

Similarly the fourth electrodes 24 are separated from each other along the chord of the control surface 12 and may be energized successively as they appear on the exposed portion of the intrados of the lifting surface 10.

In any of the three embodiments presented, the first and fourth electrodes may be isolated from the air by an electrically isolating layer, while the second and fourth electrodes may be exposed to air.

The invention is not limited to the specific embodiments herein disclosed as examples. The invention also encompasses other embodiments, covered by the claims, but not herein explicitly described, which may comprise various combinations of the features herein described.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft lifting surface comprising:

an aerodynamic surface comprising at least a first electrode embedded at a surface of the aerodynamic surface and, a control surface articulated to the aerodynamic surface, wherein the control surface comprises at least a second electrode embedded at a surface of the control surface, and that the first electrode and the second electrode are arranged and configured to create a plasma in air upon application of a predetermined electrical tension, called ionizing tension, between the first electrode and the second electrode.

2. The aircraft lifting surface according to claim 1, wherein at least one of the first electrode and the second electrode is embedded beneath a dielectric layer.

3. The aircraft lifting surface according to claim 1, wherein the first electrode is arranged in a trailing portion of the aerodynamic surface.

4. The aircraft lifting surface according to claim 1, wherein the first electrode is arranged along an open edge of a trailing edge of the aerodynamic surface.

5. The aircraft lifting surface according to claim 1, wherein the second electrode is arranged in a leading portion of the control surface.

6. The aircraft lifting surface according to claim 1, wherein in a nominal position of the control surface, a leading edge of the control surface is adapted to be housed in a trailing edge of the aerodynamic surface.

7. The aircraft lifting surface according to claim 6, wherein, in the nominal position, the second electrode is arranged on the leading edge of the control surface so as to be housed within the trailing edge of the aerodynamic surface.

8. The aircraft lifting surface according to claim 1, wherein the aerodynamic surface comprises the first electrode on an extrados and a third electrode on an intrados, wherein the control surface comprises the second electrode on an extrados and a fourth electrode on an intrados, and wherein the third electrode and the fourth electrode are configured to create a plasma in air upon application of the ionizing tension between the third electrode and the fourth electrode.

9. The aircraft lifting surface according to claim 8, wherein the third electrode is arranged in a trailing portion of the aerodynamic surface, wherein the fourth electrode is arranged on a leading edge of the control surface so as to be housed within a trailing edge of the aerodynamic surface with the control surface in the nominal position.

10. The aircraft lifting surface according to claim 1, wherein the control surface comprises an array of second electrodes, said second electrodes being separated from each other along a chord of the control surface.

11. An aircraft comprising:

the aircraft lifting surface according to claim 1.

12. The aircraft according to claim 11, further comprising:

an electrical power source connected to the first electrode and to the second electrode configured to apply the ionizing tension between the first electrode and the second electrode.

13. The aircraft according to claim 11, further comprising:

a control device configured to energize the first electrode and the second electrode upon one or more predetermined conditions.

14. The aircraft according to claim 13, wherein the control surface has a nominal position with respect to the aerodynamic surface, and the control device is configured to energize the first electrode and the second electrode when the control surface is deflected from the nominal position of at least a predetermined angle, called deflection angle.

15. The aircraft according to claim 13, wherein the aerodynamic surface comprises the first electrode on an extrados and a third electrode on an intrados, wherein the control surface comprises the second electrode on an extrados and a fourth electrode on an intrados, and wherein the third electrode and the fourth electrode are configured to create a plasma in air upon application of the ionizing tension between the third electrode and the fourth electrode, and, wherein the control device is further configured to energize the third electrode and the fourth electrode when the control surface is deflected from a nominal position below a predetermined angle.

* * * * *